United States Patent [19]
Chang et al.

[11] 3,810,042
[45] May 7, 1974

[54] TUNABLE INFRARED MOLECULAR LASERS OPTICALLY PUMPED BY A HYDROGEN-BROMIDE LASER

[75] Inventors: Tao-Yuan Chang, Middletown; Obert Reeves Wood, II, Matawan, both of N.J.

[73] Assignee: Bell Telephone Laboratories Incorporated, Murray Hill, N.J.

[22] Filed: May 8, 1972

[21] Appl. No.: 250,976

[52] U.S. Cl. ................................ 331/94.5, 330/4.3
[51] Int. Cl. .................... H01s 3/09, H01s 3/22
[58] Field of Search .................... 331/94.5; 330/4.3

[56] References Cited
UNITED STATES PATENTS
3,564,453  2/1971  Wieder ............................ 331/94.5

OTHER PUBLICATIONS
Deutsch, "Applied Physics Letters," 10, (8) 15 April 1967, pp. 234–236, QC 1 A745.
Basou et al., "J.E.T.P. Letters," Vol. 12, No. 10, Nov., 1970, pp. 329–331.
Wood et al., "Applied Physics," Letters, 18 (4), 15 Feb., 1971, QC 1 A745.
Wood et al., "Applied Physics Letters," 20 (2), 15 Jan. 1972, QC 1 A745.
Harvey, "Coherent Light," Wiley–Inter–Science, New York, 1970, pp. 346–347, TK7871.3H3.

*Primary Examiner*—Ronald L. Wibert
*Assistant Examiner*—R. J. Webster
*Attorney, Agent, or Firm*—W. L. Wisner

[57] ABSTRACT

There are disclosed laser configurations in which a high pressure molecular medium such as compressed $CO_2$, liquid $CO_2$ or solid $CO_2$ is pumped by a hydrogen-bromide molecular laser. The hydrogen-bromide laser, when transversely excited, can provide high pump powers between 4.0 and 4.6 micrometers wavelength. This wavelength range is desirable for pumping molecules having a linear three-atomic skeletal, including those molecules which are simple linear three-atomic molecules. An example of a more complicated molecule having a linear three-atomic skeletal is $CH_2CO$. The active medium has a spectrum of vibrational-rotational emission lines that merge into a continuum that is suitable for mode-locked pulsing or tunable operation.

6 Claims, 7 Drawing Figures

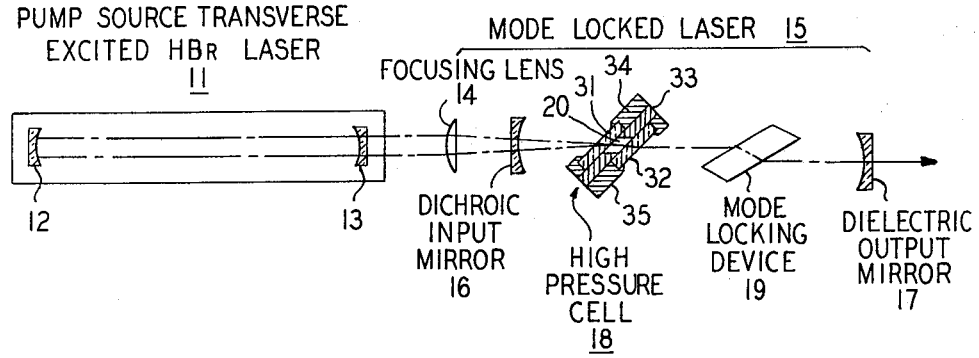
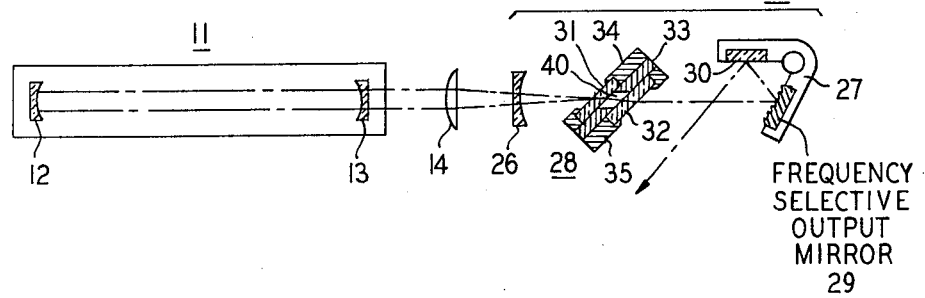
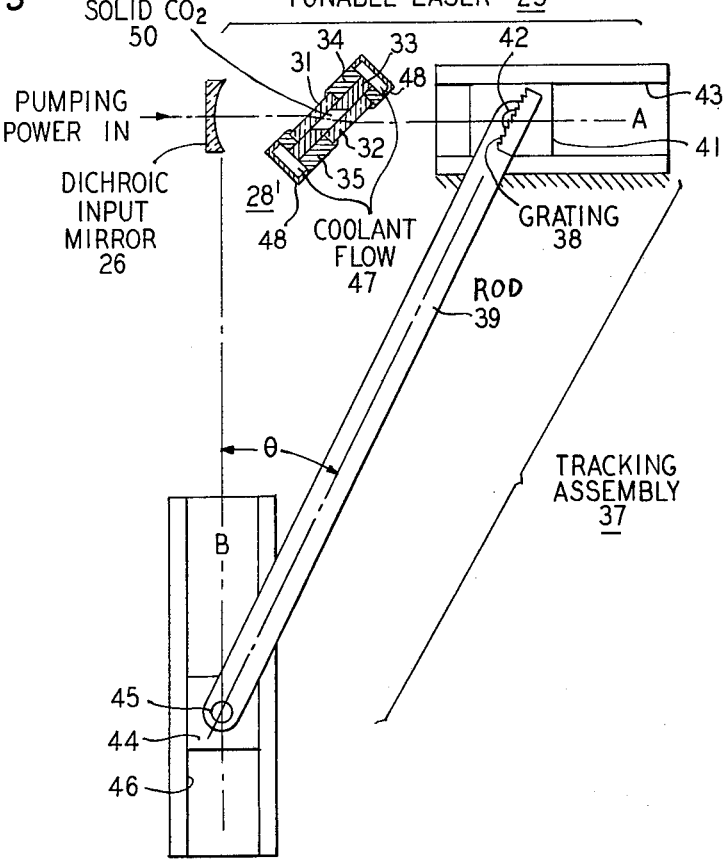

TUNABLE INFRARED MOLECULAR LASERS OPTICALLY PUMPED BY A HYDROGEN-BROMIDE LASER

BACKGROUND OF THE INVENTION

This invention relates to infrared molecular lasers of the type which operate on vibrational-rotational transitions and to techniques for providing broadband tuning of such lasers or mode-locked oscillation.

Of all the known infrared molecular lasers, the $CO_2$ laser is the most powerful and most widely used. Not only high power but also high efficiency is achieved when it is excited in an electrical discharge or by a suitable excitation technique to produce laser action on any one of several lines near 10 micrometers wavelength. The oscillating transition or transitions are all of the type known as vibrational-rotational transitions; and each transition, in energy or frequency, spans a substantial portion of the separation of the upper laser level from the ground state. The ease of excitation of this laser and the aforementioned relative spacing of the involved energy levels contribute to its high power and efficiency.

Although usually excited by an electrical discharge in a mixture with helium and nitrogen gases, this laser has also been reported to operate at low power levels of the order of 1 milliwatt when optically excited by a carbon monoxide flame, an incoherent infrared source that radiates strongly near 4.4 micrometers. This wavelength corresponds to the wavelength of photons matching the energy separation of the $CO_2$ ground state from the band of upper laser levels, called the 00°1 vibrational state. For a more complete description of the low power optical pumping technique just mentioned, see the article by I. Wieder, *Physics Letters*, Vol. 24A, page 759, 1967.

Nevertheless, the variety of configurations and pumping techniques usable with molecular lasers, such as the carbon dioxide laser, still have not provided a continuously tunable source. The individual oscillation lines are very narrow in frequency or wavelength and are separated by significant bands in which no oscillations occur. Even the atmospheric pressure transverse excitation lasers, sometimes called TEA lasers, have not significantly improved the tuning problem with molecular lasers, despite the fact that one configuration can be used for many different gases, as disclosed in the copending patent application of one of us, O. R. Wood II, with T. J. Bridges, E. G. Burkhardt, Jr. and M. A. Pollack, Ser. No. 127,873, filed Mar. 25, 1971, now abandoned, and assigned to the assignee hereof.

SUMMARY OF THE INVENTION

In accordance with our invention, a tunable infrared molecular laser employs a high pressure molecular medium, such as $CO_2$ compressed to several atmospheres pressure, liquid $CO_2$ or solid $CO_2$, which is pumped by a transverse excitation hydrogen-bromide molecular laser.

According to one specific feature of our invention, the transverse laser is uniquely adapted for pumping molecules having a linear three-atomic skeletal, including molecules which are simple linear three-atomic molecules, because most of the latter have their strongest vibrational-rotational absorption between about 4.0 and 4.4 micrometers wavelength and the hydrogen-bromide laser provides high pump powers between about 4.0 and 4.6 micrometers when transversely excited.

Advantageously, at the contemplated pressures or in the contemplated states of the active medium, the vibrational-rotational emission lines capable of oscillation merge into a continuum that is suitable for tunable operation. In addition, the high power output from the hydrogen-bromide laser can be focused into a small volume to make it even more efficient in pumping carbon dioxide at very high pressures in excess of 5 atmospheres, at which the emission lines are broadened and emerged into a continuum.

In general, for other active media of which the molecules have a linear three-atomic skeletal, the desired state, high-pressure gas, liquid or solid, in which the possible vibrational-rotational emission frequencies form a continuum, can be maintained by keeping the medium in a housing or cell and cooling the housing to maintain the selected operating temperature. Only in the case of the relatively light molecules such as $CO_2$ is a high-pressure housing typically necessary.

It is a more specific feature of our invention that such a molecular laser can either be tuned over a bandwidth that is of the order of a terahertz for $CO_2$, where 1 terahertz equals $1 \times 10^{12}$ cycles per second, or can be mode-locked to provide picosecond pulses at a center wavelength about 10.6 micrometers.

In the broader aspects of our invention, the hydrogen-bromide laser can also be used to pump optically a nitrous oxide ($N_2O$) laser or lasers employing many other linear three-atomic molecules or ions or any of a whole class of molecules which have more complicated linear three-atomic skeletal structures. Many of these molecules cannot be pumped by electrical means because of their tendency to disintegrate in an electrical discharge and consequently have never exhibited laser action.

Thus, it can be seen that our invention opens up a whole new field of endeavor in the laser art.

BRIEF DESCRIPTION OF THE DRAWING

Further features and advantages of our invention will become apparent from the following detailed description, taken together with the drawing, in which:

FIG. 1 is a partially pictorial and partially block diagrammatic illustration of a mode-locked laser according to our invention;

FIG. 2 is a partially pictorial and partially block diagrammatic illustration of a tunable laser according to our invention;

FIG. 3 illustrates a modification of the embodiment of FIG. 2 to prevent mode jumping within the continuous tuning band;

DESCRIPTION OF ILLUSTRATIVE EMBODIMENTS

Figure 4:
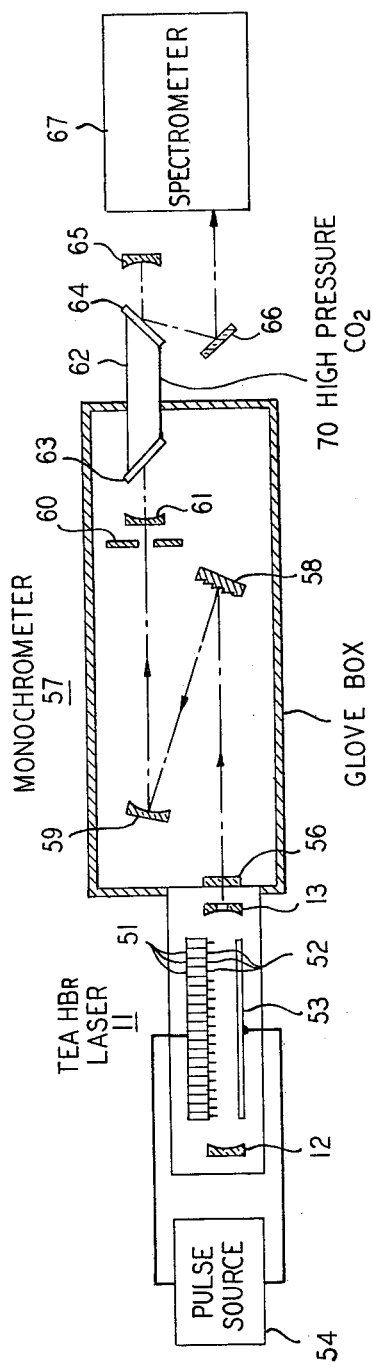
FIG. 4 is a further modification of the embodiment of FIG. 2 to provide a very narrow oscillation band such as is desirable for frequency standard type uses; for example, for spectroscopic uses.

The embodiment of FIG. 1 shows one of the two different ways in which lasers according to our invention can be used. Specifically, mode-locked laser pulses are obtained from the mode-locked laser 15 pumped by the transversely-excited high-power hydrogen-bromide laser 11. The output radiation of the hydrogen-bromide laser is focused by lens 14 through one end mirror 16 of laser 15 into a high pressure cell 18. Cell 18 contains carbon dioxide gas 20 at high pressure, illustratively about 5 atmospheres, confined by the transparent end plates 31 and 32 which are securely mounted in the pressure housings 34 and 35, respectively. The pressure housings 34 and 35 are joined laterally of the axis of the laser by the high pressure wall member 33. Illustratively, the hole defining the gas-containing region of member 33 is defined by a hole through member 33 which has an axis oblique to the major surfaces thereof, so that end windows 31 and 32 lie approximately at Brewster's angle with respect to the directions of propagation of the pumping beam radiation and laser radiation. Also included in laser 15 between cell 18 and end window 17 is the mode-locking device 19, which can be a saturable absorption cell of a suitable dye or can be an active device such as an acousto-optic modulator. We suggest the use of germanium in such an acousto-optic modulator for producing mode-locked pulses in the wavelength range near 10 micrometers. For the mode-locked laser of FIG. 1, a broad oscillation bandwidth of laser 15 is desired and is achieved by selecting broadband mirrors 16 and 17.

In practice, the carbon dioxide 20 is introduced into cell 18 at a pressure in excess of 5 atmospheres so that all the vibrational-rotational emission lines broaden and emerge into a continuum.

The theory of operation of the embodiment of FIG. 1, as well as the single frequency embodiments, can be outlined generally as follows. The high-power hydrogen-bromide laser 11 can be constructed and operated as disclosed in our article in *Applied Physics Letters*, Vol. 20, page 77, 1972, and as further detailed hereinafter in connection with FIGS. 6 and 7. It will produce up to 32 kilowatts when illustratively excited by transverse discharge. The preferred gas mixture is a mixture of helium, hydrogen and bromine at a total pressure of about 100 Torr (760 Torr equals 1 atmosphere). The power output from this laser was found to be comparable to that from a transverse discharge hydrogen fluoride (HF) laser using the same device. Since peak power output in the megawatt range has been achieved for the HF laser in other configurations, we expect that the output power of the HBr laser can be still further increased and that continuous-wave operation will be similarly achieved.

The spectral range of the HBr laser more than covers the entire $\nu_3$ absorption band of $CO_2$ which extends approximately from 4.2 micrometers to 4.4 micrometers. Since the $\nu_3$ vibrational state is the upper laser level for the electrical discharge $CO_2$ laser, the HBr laser is an ideal pump source for a $CO_2$ laser. At high pressures, i.e., above 5 atmospheres, the $\nu_3$ absorption band of carbon dioxide is expected to be a continuous spectrum without significant fine structure, except for a narrow dip at the band center located at 4.257 micrometers. Therefore, most of the HBr laser lines will be efficiently absorbed by gaseous $CO_2$ at pressures above 5 atmospheres. The same is true for liquid or solid $CO_2$.

Threshold Considerations

The power gain per unit length of a laser is given by $$\gamma = g(\nu_c)\lambda^2(n_u - n_l g_u/g_l)/8\pi\, t_{spont} \tag{1}$$

where $g(\nu_c)$ is the line shape function, $n_u$ and $n_l$ are the densities of molecules in the upper and lower laser levels, $g_u$ and $g_l$ are the degeneracy factors, and $t_{spont}$ is the spontaneous lifetime of the laser transition. For the case of optical pumping, we can assume $n_u \gg n_l\, g_u/g_l$. If we further assume the pump beam to be matched to the cavity mode, then the total gain per pass is given by $$\int \gamma\, dl = g(\nu_c)\lambda^2 N_u/8\pi a t_{spont} \tag{2}$$

where $N_u$ is the total number of molecules in the upper laser state, and $a$ is the effective cross-sectional area of the pumping beam. For a $CO_2$ laser operating on the $\nu_3 - \nu_1$ vibrational band (10.6 $\mu$m), $t_{spont}$ is known to be $\approx 4.2$ sec. At a $CO_2$ pressure $\approx 8$ atm ($\approx 6,000$ Torr) the $\nu_3 - \nu_1$ band will essentially be a continuum without rotational structure. Hence, we can take the whole $\nu_3$ state (including all rotational states) to be the upper laser state, and $g(\nu_c)$ becomes $2 \times 10^{-13} Hz^{-1}$. The total relaxation time constant of $\nu_3$ state at this pressure is 0.5 $\mu$sec. If the pump HBr laser pulse is also 0.5 $\mu$sec then $N_u$ can be approximated at one-half of the total number of pump photons absorbed. Assuming a peak power for the pump pulse of 100 KW, we get $N_u = 5.4 \times 10^{17}$. Finally, assuming $a = 3 \times 10^{-2}$ cm$^2$ and making use of Equation (2) we get $$\int \gamma\, dl = 0.038 \tag{3}$$

which corresponds to about 3.9 percent gain per pass. This amount of gain is sufficient to reach oscillation threshold. Higher pump powers will, of course, lead to even higher gains.

In the operation of the embodiment of FIG. 1, extremely narrow picosecond pulses are obtained because of the extremely broad oscillation bandwidth available within the high pressure gas 20 in cell 18. Pulsewidth in general is inversely proportional to the total gain bandwidth.

In many applications it is desirable to employ this very broad bandwidth characteristic to actually obtain a continuously tunable single frequency output rather than mode-locked pulses. In the modified embodiment of FIG. 2, the tunable laser 25 includes one conventional end mirror 26 and a high pressure cell substantially identical to that of cell 18 of FIG. 1 and an opposite end reflector 27 which includes the wavelength selective output mirror or grating 29 in one leg of a corner reflector structure that is pivoted at its vertex. With this particular reflector structure 27, broadband tuning can be achieved without significantly changing the direction of the output beam.

Unfortunately, the rotation of the frequency selective reflector 27 about its pivot point changes the normal diffracted frequency of the grating 29 at a rate substantially different from that of the resonant frequency of the cavity as its length is changed, due to the net axial displacement of reflector 29.

The tuning of this laser can be made smooth and free from the mode jumping by mounting the grating on a sliding arm, as shown in FIG. 3, so that the resonant wavelength changes from the angle of incidence on the grating and the resonant wavelength changes from the axial displacement of the grating are made to exactly coincide. Such a modified embodiment is shown in FIG. 3. Components numbered the same as in FIG. 2 remain the same; but the frequency-selective reflector 27 of FIG. 2 is replaced by the tracking assembly 37 of FIG. 3. Also, incidentally, it may be noted that liquid or solid $CO_2$ 50 is illustratively provided with the cell 28; and a coolant 47 is flowed through chambers 48 to cool the cell 28 and medium 50. The tracking assembly 37 includes a sliding arm 39 on which the grating 38 is mounted with its grating plane parallel to the axis of rod 39. The two ends of the sliding arm 39 are constrained to move along the axes of two tracks A and B, respectively. Track A is aligned with the optical axis of the laser, while track B is perpendicular to track A and intersects the latter at the fixed mirror of the laser cavity. The upper end of rod 39 is pivoted on a piston 41 which moves inside the track A having a suitable bearing surface 43. Similarly, the lower end of rod 39 pivots on piston 44 which slides within track B along its bearing surface 46. As the angle $\theta$ between the rod and the vertical axis through mirror 26 is varied, both the Littrow reflection wavelength of the grating and the resonance wavelength of a given longitudinal cavity mode will vary synchronously according to $\sin\theta$. Mode jumping of the laser can thus be avoided.

While the foregoing embodiments have disclosed gases under 5 atmospheres pressure or a liquid as the active ingredient, it is of some interest to mention more borderline operational situations. In fact, we have experimented with a system very similar to that of FIG. 2 at pressures somewhat below 1 atmosphere. At pressures below 1 atmosphere, the absorption and emission bands of gases to be pumped are no longer continuous but, rather, show well resolved structures corresponding to rotation lines. In this regime the output of an HBr laser such as laser 11 is not necessarily significantly absorbed by the gas even though the latter has an absorption band in the same wavelength range. This has been found to be the case for nitrous oxide ($N_2O$). For $CO_2$ we found that only one of the many HBr laser lines, namely, the P(6) lines of the $v = 2 \rightarrow 1$ transition band at 4.2295 micrometers, is significantly absorbed. By using this particular precise wavelength coincidence, we have obtained laser action at 10.6 micrometers for $CO_2$ pressures from a few Torr up to 1 atmosphere. The maximum output power was 80 watts for an estimated pump power of no more than 200 watts.

The experimental arrangement for these subatmospheric pressure lasers is shown in FIG. 4. The laser 11 may be the same as previously specified but is illustratively shown in sufficient detail to show a bottom electrode, the rod-like anode 53 and a multiple cathode structure 51 in which each cathode element extending into the gas orthogonal to the laser axis is connected in series with a respective resistor to the terminal of pulse source 54 opposite to the terminal to which anode 53 is connected.

The output of laser 11 is filtered through a simple monochrometer 57 consisting of a glove-box type of enclosure housing a diffraction grating 58 having, illustratively 210 grooves per millimeter blazed at 4.3 micrometers, a focusing mirror 59 of illustratively 60 centimeters focal length and an adjustable iris 60. This monochrometer is followed by a carbon dioxide laser that includes the carbon dioxide gas cell 62, illustratively 41 centimeters long, its end mirrors 61 and 65 and rock salt end windows 63 and 64. Reflector 61 illustratively has a 10 meter radius of curvature, 98 percent reflectance at 10.6 micrometers and about 30 percent transmittance at 4.23 micrometers. The reflector 65 is illustratively a gold-coated mirror having a one meter radius of curvature and essentially no transmittance. In our experiments the glove box or enclosure of monochrometer 57 was flushed with helium gas to eliminate spurious carbon dioxide molecules therein. Radiation at 4.3 micrometers and at 10.6 micrometers that is reflected from the oblique window 64 is the output of the apparatus and is monitored through a spectrometer 67 with the assistance of suitable optics such as mirror 66. There will be a partial reflection from window 64 because it is not precisely at Brewster's angle for either wavelength.

For preliminary alignment, the $CO_2$ laser including cell 62 and reflectors 61 and 65 is set into CW oscillation by an electrical discharge (by means not shown) through a $CO_2$ cell which contains a conventional lasing mixture of carbon dioxide, nitrogen and helium. Under this condition it is found that introduction of the $P_2 \rightarrow {}_1(6)$ line from the hydrogen-bromide laser into the $CO_2$ cell 62 produces a detectable reaction on the 10.6 micrometer output of the $CO_2$ laser. After maximizing this response, we extinguished the discharge and refilled cell 62 (by means not shown) with about 40 Torr of pure $CO_2$. Laser action at 10.6 micrometers could then be obtained with optical pumping alone. The peak input power at 4.23 micrometers from laser 11 entering the $CO_2$ cell 62 was measured to be 260 watts. At the spectrometer 67 the residual pump pulse is time resolved from the $CO_2$ laser pulse by conventional techniques. The amplitude of the residual pump pulse decreases monotonically with increasing $CO_2$ pressure in the cell 62. In the $CO_2$ laser pulse there exists an optimum pressure for which the pulse amplitude is maximum and the pulse delay is minimum. As the cell pressure is varied away from the optimum value, the pulse amplitude decreases and the pulse delay increases. Introduction of air into the glove box of the monochrometer 57 also attenuates the pump pulse because of the residual $CO_2$ in the air and quenches the 10.6 micrometer output.

Only when the monochrometer was set to the $P_2 \rightarrow(6)$ line of HBr could optically pumped laser action at 10.6 micrometers be obtained, at least for the case for $CO_2$ gas pressures less than 1 atmosphere. The $P_2 \rightarrow(6)$ line actually consists of two isotope components of nearly equal strength, separated by about 0.36 wave numbers (about 10 gigahertz), which are not resolved by our simple monochrometer. We surmise from spectroscopic data that the component due to the $Br^{81}$ isotope is largely responsible for the observed optical pumping. On the other hand, when an electrical discharge was present in the $CO_2$ cell, a detectable reaction at 10.6 micrometers was produced upon introduction of any one or all of the following six lines from HBr: $P_2 \rightarrow {}_1(4)$, $P_2 \rightarrow {}_1(6)$, $P_2 \rightarrow {}_1(7)$, $P_2 \rightarrow {}_1(8)$, $P_3 \rightarrow (5)$ and $P_3 \rightarrow {}_2(6)$.

Figure 5:
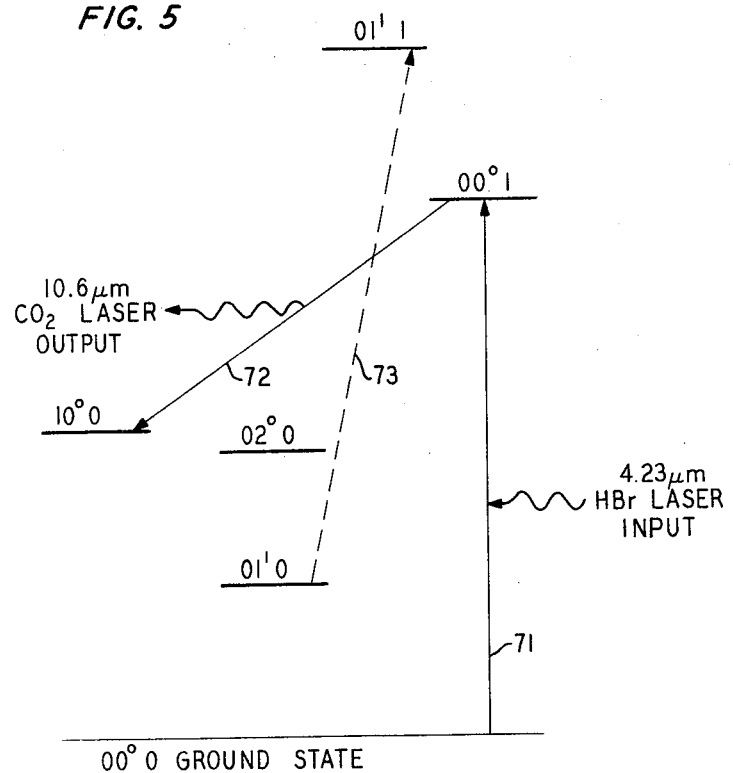
FIG. 5 shows an energy level diagram and transitions which are pertinent to the explanation of the operation of our invention.

We conclude that most of these lines are pumping various transitions belonging to the $01^10 \rightarrow 01^11$ absorption band of $CO_2$, shown as the dashed line 73 in FIG. 5. Two possible exceptions to these assignments are a) the $P_2 \rightarrow {}_1(7)$ line of $HBr^{81}$, which may be causing transitions (not shown) in the $10^00 \rightarrow 10^01$ band and b) the $P_2 \rightarrow {}_1(4)$ line of HBr, which does not match known $CO_2$ transitions with any certainty. The 10.6 micrometer $CO_2$ laser output of the embodiment of FIG. 4 is indicated by the line 72 in FIG. 5.

Several additional experiments were performed on this system with the diffraction grating (G) replaced by a gold-coated mirror. The results of these experiments are summarized as follows: (1) When the gold-coated mirror $M_2$ was replaced by a 98 percent reflectance mirror identical to $M_1$, the maximum output power at 10.6 μm was nearly 40 percent of the input power at 4.23 μm, i.e., approaching the condition of unity quantum efficiency! Under these conditions the pulse delay became negligible. (2) With longer (66 cm) lower pressure (20 Torr) cells, sufficient optical gain was present to permit replacement of mirror $M_2$ with a Littrow mounted diffraction grating. Under these conditions the 10.6 μm $CO_2$ output could be tuned to any transition from P(10) to P(28) in the $00^01 \rightarrow 10^00$ band of $CO_2$. (3) With a more tightly focused pump beam (using a 15 cm focal length lens) in combination with a shorter $CO_2$ cell (12 cm) oscillation was achieved with atmospheric pressure $CO_2$ in the cell.

The optically pumped lasers of FIGS. 1–4 in general can be modified to employ either liquid or solid $CO_2$, as well as gaseous $CO_2$, and can be extended to still other systems such as those including gaseous, liquid or solid nitrous oxide ($N_2O$) since the vibrational mode structure of $N_2O$ is very similar to that of carbon dioxide. In fact, many other linear three-atomic molecules, such as ClCN, BrCN, ICN or ions, such as $CN_2^{-2}$, $N_3^{-1}$, $NCO^{-1}$, $NCS^{-1}$ and $BO_2^{-1}$, can be used. Each of them has an analogous vibrational mode structure to $CO_2$ and $N_2O$ and has a higher frequency stretching mode located in the 4.2 to 4.6 micrometer region. Still further, there can be used molecules with a linear three-atomic skeletal. The skeletal is that portion of the compound typically characterized by the organic type bonds and in this case characterized by a linear arrangement of the elements thus bonded. Each of the elements in the skeletal may have other elements bonded thereto as part of a side group attached to the skeletal. Examples of the chemical formulas for such materials are: $CH_2CO$, $HNCO$, $CH_3CN$ and $BH_3CO$. In each case the side group elements are the hydrogen atoms; and they do not have significant effect on the vibrational mode structure and the higher frequency stretching mode. Consequently, the latter is still located in the 4.2 to 4.6 micrometer region.

In addition, carbon disulfide ($CS_2$), which has exhibited laser action near 11.5 micrometers, also has an appropriate absorption band at 4.3 micrometers. All of these molecules and their homologues are therefore candidates for optical pumping by an HBr laser in the configurations of our invention.

Figure 6:
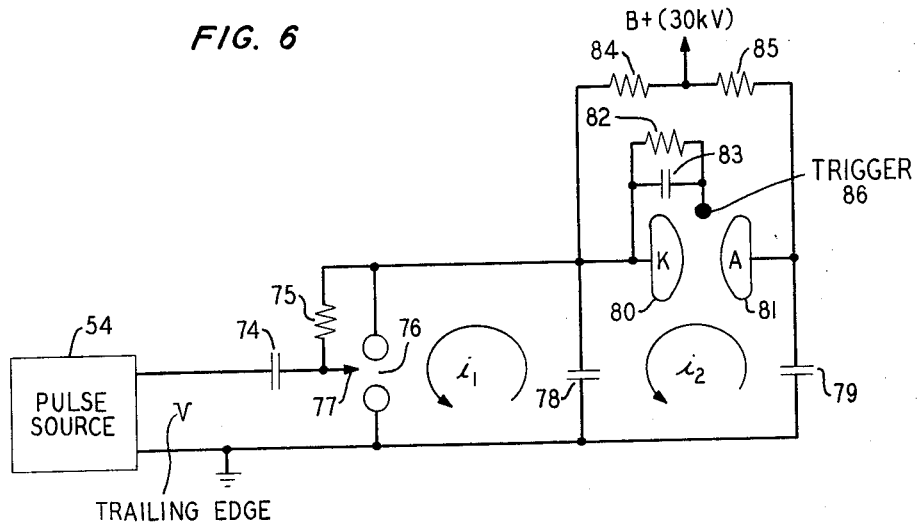
FIG. 6 is a partially schematic and partially block diagrammatic illustration of the excitation circuit for the transversely-excited hydrogen-bromide laser.
Figure 7:
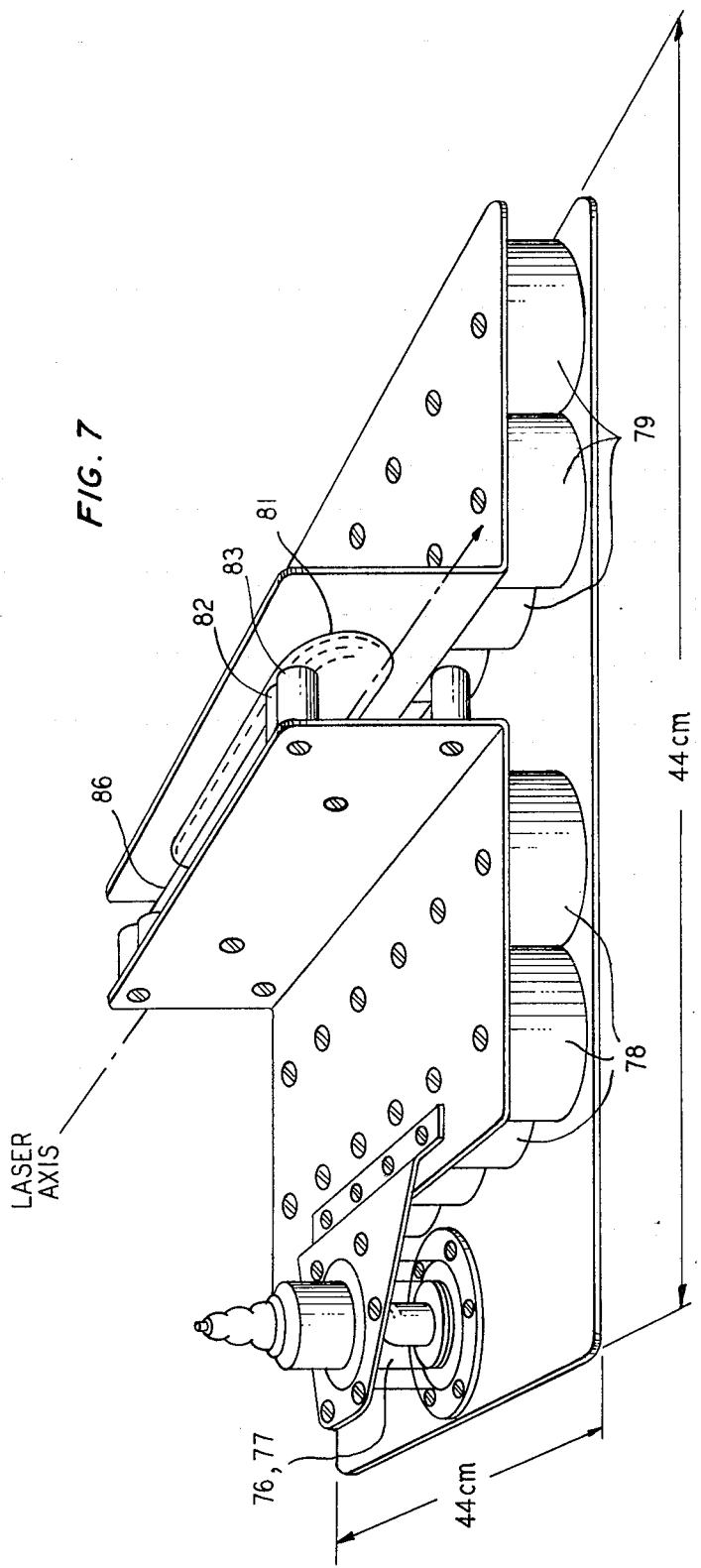
FIG. 7 is a pictorial illustration of the physical structure for the implementation of the circuitry of FIG. 6.

The details of excitation and structure of the hydrogen-bromide laser 11 of FIGS. 1–4 are illustrated in FIGS. 6 and 7, respectively. Although a large number of arrangements of apparatus for uniform electrical discharge in transversely-excited high-pressure lasers are disclosed in the literature, we prefer the simplified design of FIGS. 6 and 7. This design reduces the high voltages required in portions of the prior art circuits and permits the use of simpler electrode profiles. The voltage reductions are attributable to the use of a fast voltage-doubling circuit known as an LC inversion generator, first described by R. A. Fitch "Marx and Marx-Like High Voltage Generators," *IEEE Transactions on Nuclear Sciences*, Volume NS-18, page 190 (August, 1971)

Thus, in FIG. 6, the cathode 80 and the anode 81 are driven through a voltage-doubling circuit that is built around the voltage-doubling capacitors 78 and 79. These capacitors are initially charged from a 30 kilowatt direct-current source through resistors 84 and 85, respectively. At this point it will be noted that there is no potential difference after the initial charging between cathode 80 and anode 81. Triggering of the voltage-doubling action is accomplished by a circuit connected across capacitor 78 and including the spark gap 76, the excitation trigger electrode 77 and the pulse source 54 connected across spark gap 76 through capacitor 74 and resistor 75. The trigger electrode 77 is connected to the common point of capacitor 74 and resistor 75.

Upon the occurrence of the suitable pulse from source 54, trigger 77 breaks down spark gap 76 and capacitor 78 discharges therethrough with a sufficient inductance of the connecting leads and the gap that the trigger circuit rings through half a cycle to charge capacitor 78 in the reverse direction. The voltages of capacitors 78 and 79 are now connected in series-aiding fashion across cathode 80 and anode 81. The space between cathode 80 and anode 81 is broken down by the discharge trigger wire 86 running parallel to the laser axis (out of the plane of the paper). Trigger wire 86 is connected to cathode 80 through the parallel combination of resistor 82 and capacitor 83.

The use of the circuit of FIG. 6 means that the required power supply voltage and storage capacitor voltage rating are halved and the problems of insulation and corona are significantly reduced.

Another simplification results from the use of a readily available extruded form for the main discharge electrodes 80 and 81.

The physical structure of hydrogen-bromide laser 11 without its envelope and mirrors 12 and 13 of FIG. 6 is shown in FIG. 7. A careful comparison of FIGS. 6 and 7 will show that the corresponding components are illustrated pictorially in FIG. 7, whereas they were shown schematically in FIG. 6.

A laser 11 constructed in the foregoing manner yields a high multimode output energy. Furthermore, when apertured for fundamental mode operation, the laser can exhibit a high degree of self mode-locking, depending on the specific gas mixture used.

Initiation of the main discharge may be more particularly described as follows. Application of high voltage between cathode 80 and anode 81 causes an initial breakdown to take place between trigger wire 86 and anode 81 because of the highly concentrated electric field appearing around trigger wire 86. This auxiliary discharge between trigger wire 86 and anode 81 induces a uniform glow discharge between cathode 80 and anode 81 rather than random arcs therebetween. A discharge cycle starts with an initial charging of the respective capacitor banks 78 and 79 to 30 kilovolts. The breakdown of the gas in the main discharge tube quickly damps out the ringing current of the circuit formed by capacitor bank 78 and spark gap 76. The main discharge absorbs most of the energy previously stored in the circuit.

The spark gap 76 may be formed by a "fire injector" spark plug and a rounded brass post placed inside a plexiglass chamber. The chamber is pressurized with air at forty pounds per square inch to obtain a high switching speed.

It is of further interest that the laser anode 81 was made from a 38 centimeter long section of a commercially extruded aluminum handrail whose ends had been appropriately rounded to avoid field concentrations. After polishing and buffing, the surface was plated with rhodium for surface durability. The cathode 80, which cannot be seen in FIG. 7, is identical to the anode.

We claim:

1. Apparatus for the stimulated emission of coherent radiation, comprising an active molecular medium of which the molecules have a linear three-atomic skeletal structure, means for maintaining a state of said medium in which state the vibrational-rotational emission frequencies of said medium substantially form a continuum including means for maintaining a pressure at least as great as five atmospheres in a gaseous form of said medium, means for pumping said medium, said pumping means comprising a transverse-excitation hydrogen bromide laser with an active medium pressure of at least 100 torr, excited by a discharge transverse to its laser axis and oscillating at a wavelength between 4.0 and 4.6 micrometers, and means for stimulating the emission of coherent radiation from said medium.

2. Apparatus according to claim 1 in which the active medium is a liquid active medium.

3. Apparatus according to claim 1 in which the molecules of the active medium have a simple linear three-atomic structure.

4. Apparatus according to claim 3 in which the active medium is a gas and the means for maintaining the aforesaid state of the medium comprises a cell capable of maintaining said gas at a pressure of at least about five atmospheres.

5. Apparatus according to claim 1 including means for tuning said apparatus for oscillation at a selected frequency, said tuning means including a diffraction grating and means for varying the orientation and spacing of said grating with respect to the remainder of said apparatus to provide continuous tuning.

6. Apparatus according to claim 1 in which the active medium is a solid active medium.

* * * * *